(12) United States Patent
Loh et al.

(10) Patent No.: US 6,476,949 B1
(45) Date of Patent: Nov. 5, 2002

(54) DISPERSION COMPENSATION IN OPTICAL FIBRE TRANSMISSION

(75) Inventors: Wei-Hung Loh, Southampton (GB); Richard Ian Laming, Southampton (GB); David Atkinson, West Yorkshire (GB); John James O'Reilly, London (GB)

(73) Assignee: Cisco Photonics Italy S.r.L., Milan (IT)

( * ) Notice: Subject to any disclaimer, the term of this patent is extended or adjusted under 35 U.S.C. 154(b) by 0 days.

(21) Appl. No.: 09/125,649

(22) PCT Filed: Feb. 21, 1997

(86) PCT No.: PCT/GB97/00504

§ 371 (c)(1),
(2), (4) Date: Apr. 7, 1999

(87) PCT Pub. No.: WO97/31435

PCT Pub. Date: Aug. 28, 1997

(30) Foreign Application Priority Data

Feb. 23, 1996 (GB) ................................................ 9603911

(51) Int. Cl.[7] .............................................. H04B 10/00
(52) U.S. Cl. ...................... 359/161; 359/130; 359/161; 359/173; 385/37
(58) Field of Search ................................. 359/161, 173, 359/130

(56) References Cited

U.S. PATENT DOCUMENTS 5,278,687 A * 1/1994 Jannson et al.
5,570,439 A * 10/1996 Ido et al.
5,701,188 A * 12/1997 Shigematsu et al.

FOREIGN PATENT DOCUMENTS

EP 0 684 709 A1 11/1995
WO WO 96/31024 10/1996

OTHER PUBLICATIONS

K. Hill et al., "Chirped in–fiber Bragg gratings for compensation of optical–fiber dispersion", Optics Letters, 19(17):1314–1316 (1994).

S.V. Chernikov et al., "Dispersion compensation of 100–Gbit/s optical–fiber transmission by using a chirped–fiber–grating transmission filter", OFC 95' Technical Digest, 8:99–100 (1995).

* cited by examiner

Primary Examiner—Leslie Pascal
Assistant Examiner—Dzung Tran
(74) Attorney, Agent, or Firm—Oblon, Spivak, McClelland, Maier & Neustadt, P.C.

(57) ABSTRACT

An optical transmission apparatus for transmission of optical signals at an optical wavelength of about 1550 nanometers. The optical transmission apparatus includes a single mode optical fiber link formed of optical fiber having substantially zero dispersion at an optical wavelength of about 1300 nanometers and a dispersion of about 17 picoseconds per nanometer-kilometer at an optical wavelength of about 1500 nanometers. Further, at least one dispersion compensating chirped optical fiber grating is coupled to the optical fiber link, the aggregate dispersion of the at least one dispersion compensating chirped optical fiber grating substantially compensating for the dispersion of the optical fiber link. Further, the at least one dispersion compensating chirped optical fiber grating is coupled at respective positions substantially symmetrically disposed about the longitudinal center of the optical fiber link.

10 Claims, 3 Drawing Sheets

DISPERSION COMPENSATION IN OPTICAL FIBRE TRANSMISSION

BACKGROUND OF THE INVENTION

1. Field of the Invention

This invention relates to dispersion compensation in optical fibre transmission.

2. Discussion of the Background

Data transmission in optical fibres is generally limited by power loss and pulse dispersion. The advent of erbium-doped fibre amplifiers (EDFAs) has effectively removed the loss limitation for systems operating in the third optical communication window (around a wavelength of about 1.55 μm (micrometer)), leaving pulse dispersion as a serious limitation, especially in future high-capacity multi-wavelength optical networks.

More importantly, most fibre which has already been installed for telecommunication links (ie. standard non-dispersion shifted fibre) exhibits a dispersion zero around 1.3 μm and thus exhibits high (about 17 ps/nm.km (picosecond per nanometer-kilometer)) dispersion around 1.55 μm. Upgrading this fibre to higher bit rates involves the use of EDFAs and a shift in operating wavelength to 1.55 μm where dispersion-compensation becomes a necessity.

Several techniques have been demonstrated including laser pre-chirping, midspan spectral-inversion (phase-conjugation), the addition of highly-dispersive compensating fibre and chirped fibre gratings. Chirped fibre gratings are of particular interest, since they are compact, low-loss and offer high negative-dispersion of arbitrary and tunable profile.

When one or more chirped fibre gratings are used to provide dispersion compensation in an optical fibre link, they introduce an associated optical signal loss. It has therefore been proposed that the grating(s) should be used at an input end of an optical fibre link, preferably followed by an optical amplifier, so that the optical power launched into the link can be restored to a desired level after pre-compensation by the chirped grating(s). This previous proposal makes use of the fact that dispersion compensation of an optical pulse launched into a dispersive optical fibre link can be applied as a pre-compensation before the pulse enters the link because the dispersion and dispersion compensation are linear effects.

It is a constant aim to improve dispersion compensation techniques in optical fibre transmission systems, and particularly in systems which have already been installed using the so-called standard telecom fibre defined above. In such installed systems, any improvements must be made by discrete components rather than by using a different type of fibre for the transmission link.

Optics Letters Vol. 19, No. 17, 1994, pp 1314–1316 is an early paper on dispersion compensation using chirped fibre gratings. No teaching is given on the position of the gratings in the link to be compensated. EP-A-0 684 709 discloses a dispersion compensation arrangement using dispersion-compensating optical fibres.

SUMMARY OF THE INVENTION

This invention provides optical transmission apparatus for transmission of optical signals at an optical wavelength of about 1550 nanometers, the apparatus comprising:

a single mode optical fibre link formed at least in part of optical fibre having substantially zero dispersion at an optical wavelength of about 1300 nanometers and a dispersion of about 17 picoseconds per nanometer-kilometer at an optical wavelength of about 1550 nanometers; and one or more dispersion compensating chirped optical fibre gratings, the aggregate dispersion of the chirped optical fibre gratings substantially compensating for the dispersion of the optical fibre link;

characterised in that the one or more gratings are coupled to the optical fibre link at respective positions substantially symmetrically disposed about the longitudinal centre of the optical fibre link.

The invention recognises that there is a difference in the performance of an optical link of the so-called standard telecom fibre when used at 1550 nm, depending on the positioning of the gratings. This difference is not predicted by the previously accepted linear effect of dispersion compensation. In such a linear system, it would not matter where the gratings were positioned.

A physical reason for the dependence on grating positioning is that the peak optical power at positions along the fibre link varies in dependence on where the dispersion compensation is performed. This peak optical power then determines the non-linear response of the fibre links.

As optical pulses propagate along an optical fibre, the fibre dispersion causes different wavelengths to travel at different velocities. The effect of this on a single gaussian pulse would simply be to broaden the pulse in the time domain, thus lowering the instantaneous peak power. However, in a train of pulses (as in a real communications link), each individual pulse can be time-broadened into the bit period for an adjacent pulse, so there can be times when, locally, the peak optical power actually exceeds the peak power launched into the fibre.

By counter-intuitively distributing the dispersion compensation at intervals along the fibre, the maximum dispersion of the pulse train at any point alone the fibre link is lower than if the dispersion compensation were provided simply at the input or output of the link. This leads to a lower maximum local peak optical power along the link, and so to an improvement in non-linear distortion along the link. Ultimately, this improvement can lead to longer (or cheaper) links being possible for the same dispersion compensating and amplifying components.

This invention therefore goes against conventional teaching, which would suggest that if the optical pulses are pre-dispersed, the optical power would be "smeared out" and so the peak optical power would be reduced. In fact, it has been found that the opposite can happen.

The invention is also distinct from systems employing, for example, lengths of dispersion compensating optical fibre as dispersion compensating devices. In such previous systems, fibre non-linearity has not been regarded as a problem.

It will be appreciated by the skilled man that the exact positioning of components in an optical fibre link may depend on the ease of access to the link (which may, for example, be underground) and so components may be positioned within, say, 10% of the approximate positions specified above while still falling within the advantageous arrangement of embodiments of the invention. Similarly, the skilled man will appreciate the slight latitude in the definition of "standard" telecom fibre used above.

Preferably each such grating is connected to the link by an optical circulator.

Apparatus according to the invention is particularly usefully employed in optical communication apparatus also comprising: an optical transmitter connected to an input end of the optical transmission apparatus, the optical transmitter being operable to generate optical signals at an optical wavelength of about 1550 nanometers and an optical receiver connected at an output end of the optical transmission apparatus, the optical receiver being operable to receive optical signals at an optical wavelength of about 1550 nanometers.

BRIEF DESCRIPTION OF THE DRAWINGS

The invention will now be described by way of example only with reference to the accompanying drawings in which.

DESCRIPTION OF THE PREFERRED EMBODIMENTS

Figure 1:
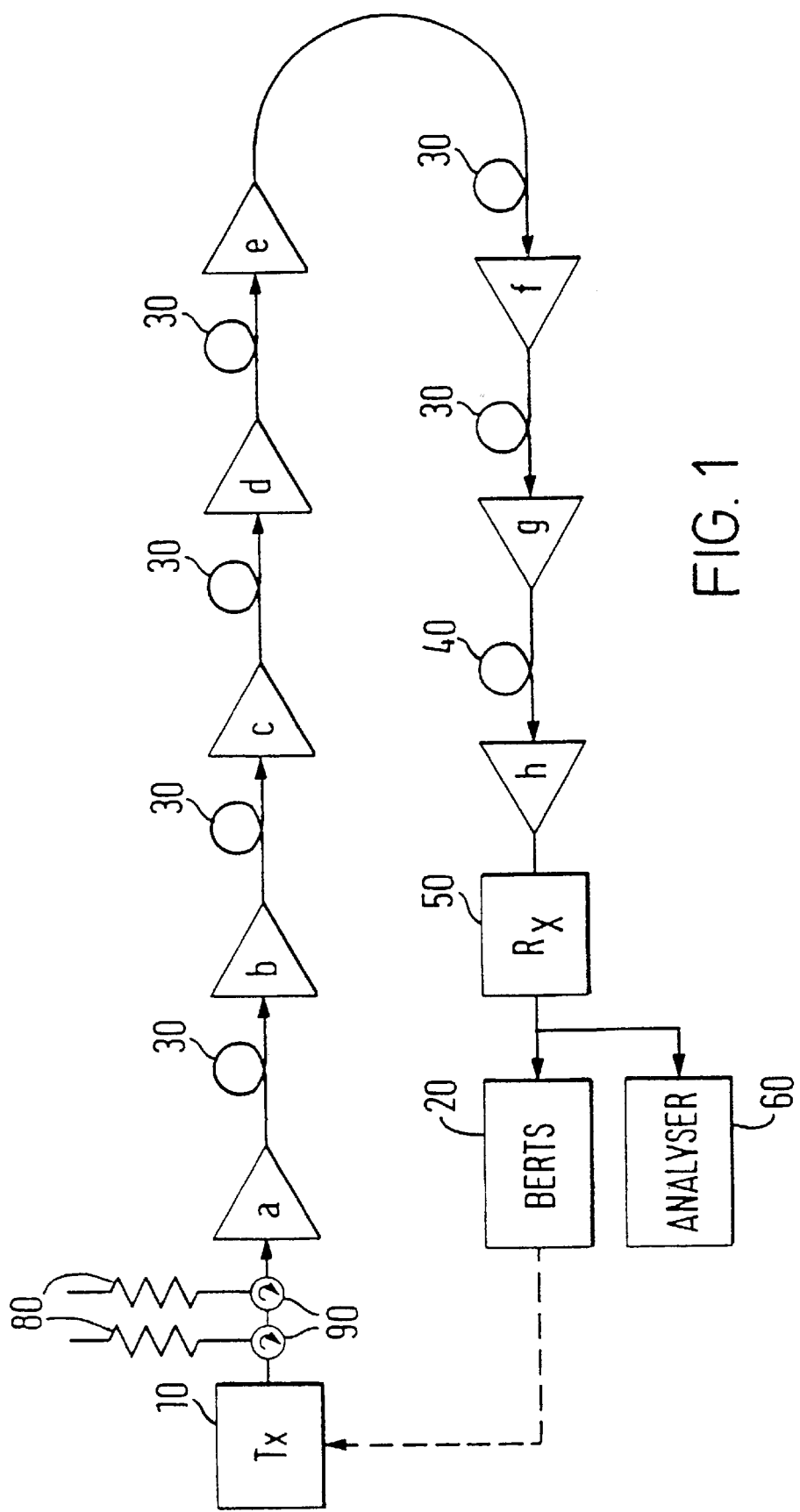
FIG. 1 is a schematic diagram of an optical fibre transmission link.

Referring now to FIG. 1, an optical fibre transmission link comprises an optical transmitter 10, in this example operating under the control of a bit error rate (BER) test set (BERTS) 20. The transmitter operates at an optical wavelength of 1.55 μm to generate substantially chirp-free, non-return-to-zero (NRZ) pulses at 10 Gbit/s (gigabits per second). The pulses have a raised cosine profile in the time domain so that the optical intensity from a single pulse representing a binary "1" falls to zero at the centre of the bit period for adjacent bits.

The optical output of the optical transmitter 10 is connected to a series of optical amplifiers (denoted by a, b, c, d, e, f, g and h) between which are respective 100 km (kilometer) spans 30 of so-called standard telecom optical fibre, exhibiting (as described above) high dispersion at 1.55 μm.

At the output of the final amplifier in the series, amplifier g, there is a further variable length span 40 of the standard telecom fibre. This supplies an optical signal to an optical receiver 50, which in turn is electrically connected to the BERTS 20. Thus, the BERTS 20 generates bit patterns to be converted into an optical signal by the transmitter 10, and then compares the output of the optical receiver 50 with the intended bit pattern to detect bit errors which have occurred in transmission via the optical link.

The specific details of the components shown in FIG. 1 are as follows. The optical fibre dispersion is 17 ps/(nm.km), the fibre loss 0.23 dB/km, the fibre non-linear refractive index coefficient $n_2$ $2.6 \times 10^{-20}$ m$^2$/W, and the effective core area 80 μm$^2$. The gain of each optical amplifier a . . . h is substantially linear and is set so that the average optical power launched into the following fibre span 30, 40 is +6 dBm. The receiver 50 comprises a 125 GHz bandwidth optical filter followed by a square-law optical detector. The resulting electrical signal is electrically filtered by a third order Butterworth filter with a 10 GHz 3 dB bandwidth. The BERTS generates a 256-bit random bit sequence.

Figure 2A:
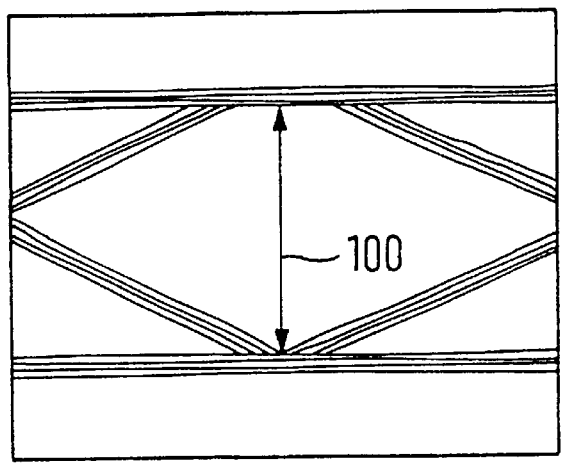
FIG. 2a is a schematic representation of an eye diagram.

The electrical output of the receiver 50 is also connected to an analyser 60 which, using known techniques, provides an eye diagram representing the transmission properties of the optical link. Eye diagrams are well known and will not be discussed in detail here. However, to define the terms to be used in this description, FIG. 2a illustrates a schematic eye diagram and shows the eye opening 100. This eye opening can be measured with and without the optical fibre spans and associated components (such as the gratings to be described below) in place. (i.e. the eye opening can be measured in a "back-to-back" configuration where the optical transmitter is connected directly to the optical receiver). In this description, the "eye penalty" for a particular configuration of the optical link is defined as the ratio (expressed in decibels (dB)) of the eye opening in the back-to-back configuration to the eye opening with the link in that configuration. A numerically larger eye penalty implies a worse link performance.

In the present arrangement, two identical dispersion chirped optical fibre compensating gratings 80, each providing equivalent compensation to the dispersion of 300 km of the optical fibre, are connectable by series-inserted optical circulators 90 at various points in the link. In FIG. 1 the gratings are shown both connected at the input of amplifier a (the output could just as easily be used), but in fact they are separately connectable at the inputs (outputs) of any of the amplifiers a . . . h. For the experiments/simulations described below, the gratings 80 were connected in four configurations:

| | |
|---|---|
| aa | both gratings connected at the input of amplifier a (in fact as shown in FIG. 1) |
| ah | one grating at the input of amplifier a and one at the input of amplifier h |
| ce | one grating at the input of amplifier c and one at the input of amplifier e (i.e. at ⅓ and ⅔ positions along the length of the link when the span 40 was set to zero) |
| dd | both gratings connected at the input of amplifier d |

Figure 2B:
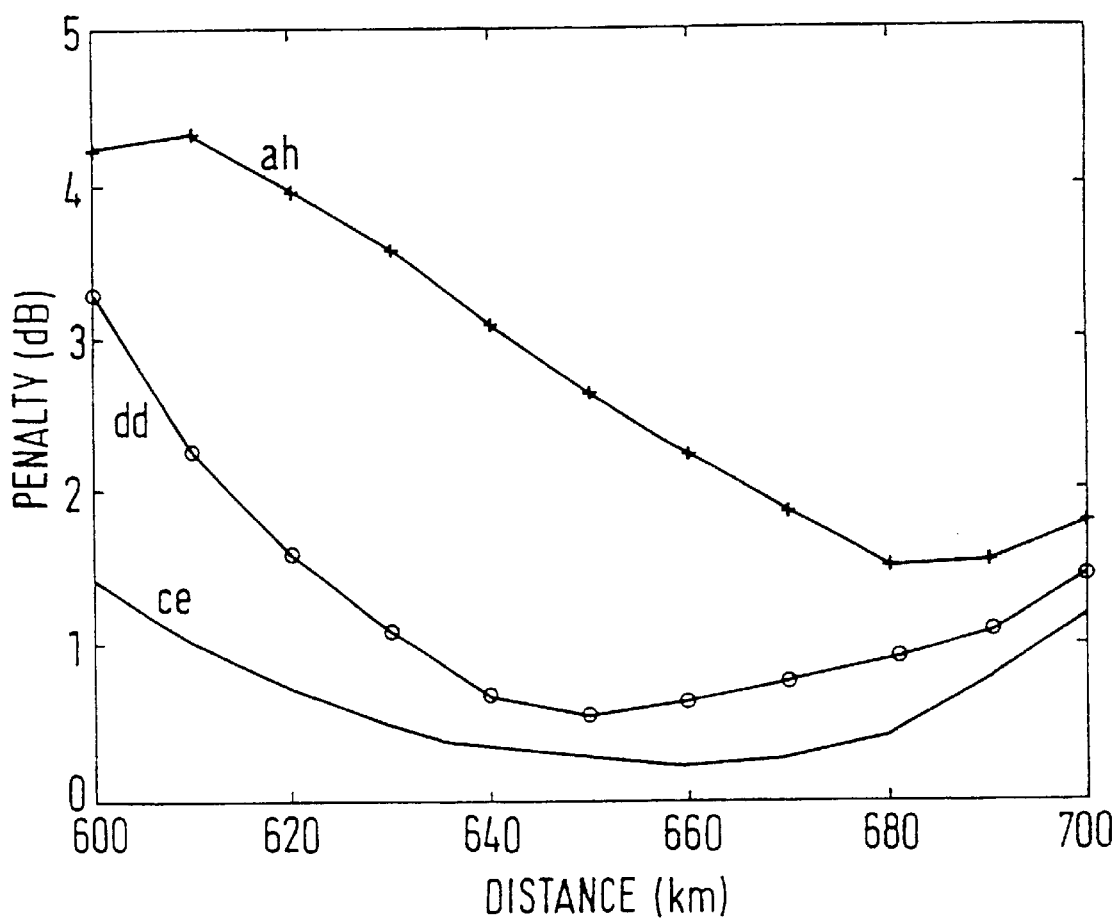
FIG. 2b is a schematic graph of eye closure penalty against transmission link length.
Figure 3:
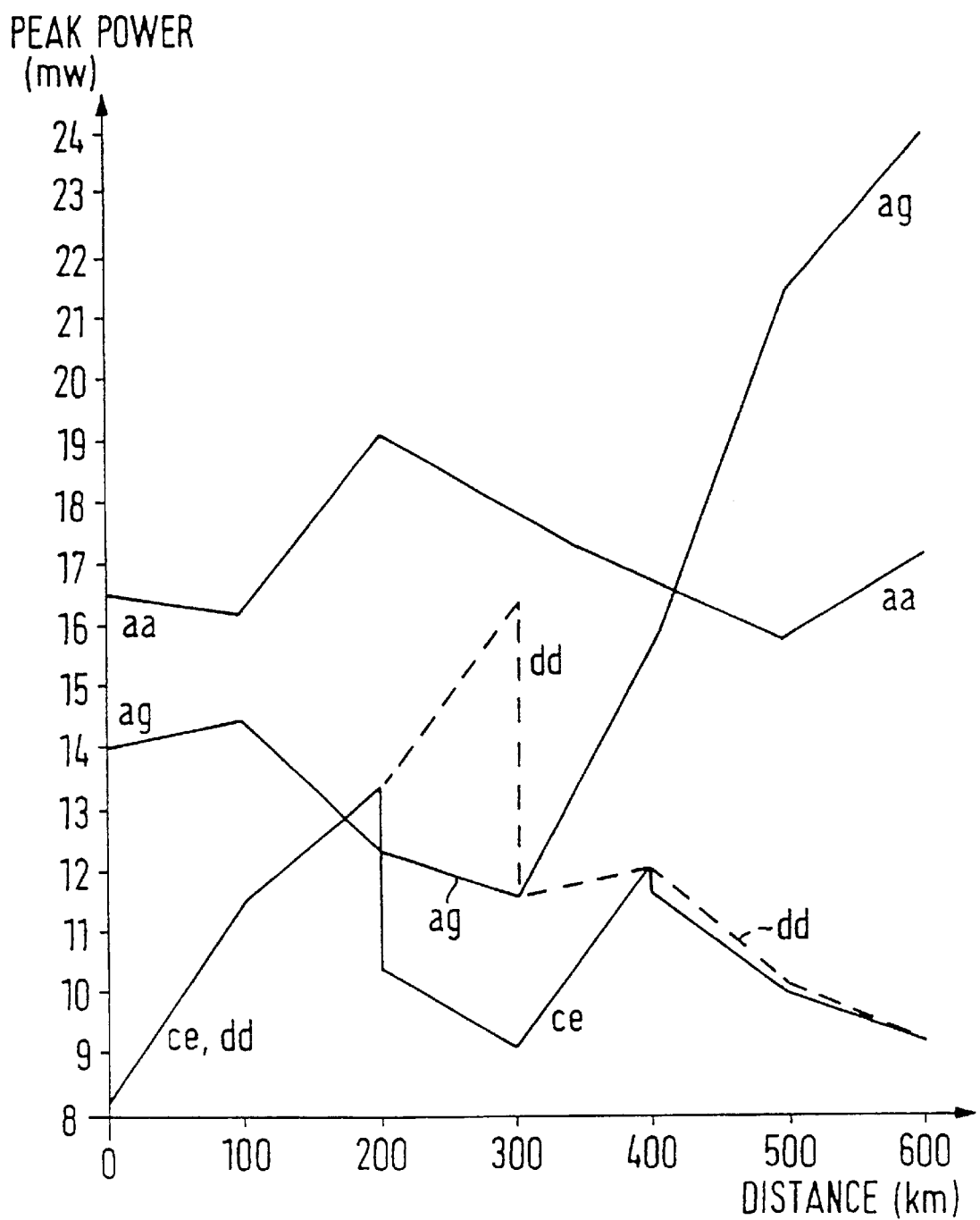
FIG. 3 is a schematic graph of peak optical power at six positions along the transmission link of FIG. 1.

FIG. 2b is a schematic graph of eye closure penalty against transmission link length for the three grating configurations ah, dd and ce, and FIG. 3 is a schematic graph of peak optical power at six positions along the transmission link for the four grating configurations aa, ag, ce and dd. In fact the graphs of FIGS. 2b and 3 have been obtained by numerical simulation of the link of FIG. 1, but the main conclusions have also been confirmed by experiment.

For FIG. 2b, the length of the fibre span 40 was allowed to increase to enable values to be obtained for overall link lengths over 600 km. For FIG. 3, the length of the span 40 was set to zero. Because of the constraints on amplifier outputs described here, this meant that for FIG. 3 the amplifier h had a substantially 0 dB net gain.

FIG. 2b demonstrates that, of the configurations shown, the best (lowest) eye closure penalty is obtained when the two gratings are at amplifiers c and e. Also, the configuration dd (in which the two gratings effectively form a single dispersion compensator for the whole 600 km link and are functionally equivalent to a single grating disposed at the centre of the link and capable of compensating the dispersion of the whole 600 km link) is still significantly better than an arrangement in which the gratings are at the beginning and end of the link (ag).

This principle has been extended by other experiments to show that it is most desirable to employ an optical fibre transmission link comprising two or more optical fibre spans of substantially equal length, in which a respective dispersion compensating device is connected between adjacent pairs of the fibre spans. Here, the compensating device(s) should substantially compensate for the dispersion of 1+1/(n−1) fibre spans, where n is the number of spans in the link. For example, in a three-span link having two fibre gratings disposed at ⅓ and ⅔ of the way along the link (as in the configuration ce), each grating should substantially compensate for 1 +½ spans of the fibre, i.e. half of the total length of the link.

This same principle also applies to an optical fibre transmission link comprising two or more dispersion compensating devices connected to the link at positions substantially symmetrically disposed about the longitudinal centre of the link.

This difference in link performance depending on the positioning of the gratings is not predicted by the previously accepted linear effect of dispersion compensation. In such a linear system, it would not matter where the gratings were positioned.

A physical reason for the dependence on grating positioning noted here is that the peak optical power at positions along the fibre link varies in dependence on where the dispersion compensation is performed. This peak optical power then determines the non-linear response of the fibre links.

As optical pulses propagate along an optical fibre, the fibre dispersion causes different wavelengths to travel at different velocities. The effect of this on a single gaussian pulse would simply be to broaden the pulse in the time domain, thus lowering the instantaneous peak power. However, in a train of pulses, each individual pulse can be time-broadened into the bit period for an adjacent pulse, so there can be times when, locally, the peak optical power actually exceeds the peak power launched into the fibre.

FIG. 3 is a schematic graph showing this variation in peak power along the 600 km link of FIG. 1 (the six 100 km sections 30 between amplifier a and amplifier g), with the dispersion compensating gratings in configurations aa, ag, dd and ce. The average power is set to +6 dBm at the output of each amplifier. The curves aa, ag, ce and dd are different because of the different temporal distribution of optical power caused by the dispersion effects, which in turn leads to a different instantaneous distribution of peak optical power.

Curves ce and dd start the same at the left hand side of FIG. 3, but at 200 km into the link (the position (c) of the first grating in configuration ce), the curves diverge with curve dd showing a greater peak power than curve ce. Curves It can be seen that the maximum value of the local peak power is lowest for the configuration ce, followed by the curve dd. Curves aa and ah show much higher levels of peak power.

The lower peak powers given by configurations ce and dd lead to lower levels of non-linear distortion in the fibre and so to better (lower) eye closure penalties at the receiver.

What is claimed is:

1. Optical transmission apparatus for transmission of optical signals at an optical wavelength of about 1550 nanometers, comprising:
    a single mode optical fiber link formed at least in part of optical fiber having substantially zero dispersion at an optical wavelength of about 1300 nanometers and a dispersion of about 17 picoseconds per nanometer-kilometer at an optical wavelength of about 1550 nanometers; and
    at least one dispersion compensating chirped optical fiber grating, the aggregate dispersion of the at least one dispersion compensating chirped optical fiber grating substantially compensating for the dispersion of the optical fiber link;
    wherein the at least one dispersion compensating chirped optical fiber grating is coupled to the optical fiber link at respective positions substantially symmetrically disposed about the longitudinal center of the optical fiber link.

2. Apparatus according to claim 1, wherein each of the at least one dispersion compensating chirped optical fiber grating is connected to the optical fiber link by a respective optical circulator.

3. Apparatus according to claim 1, wherein the optical fiber link comprises two or more serially connected optical fiber sections, a respective optical amplifier being disposed between serially adjacent fiber sections.

4. Apparatus according to claim 2, wherein the optical fiber link comprises two or more serially connected optical fiber sections, a respective optical amplifier being disposed between serially adjacent fiber sections.

5. Apparatus according to any one of claim 1, 2, 3, or 4, wherein the at least one dispersion compensating chirped optical fiber grating is one dispersion compensating optical fiber grating for substantially compensating the dispersion of the whole link and coupled to the link substantially at the longitudinal center of the link.

6. Apparatus according to any one of claim 1, 2, 3, or 4, wherein the at least one dispersion compensating chirped optical fiber grating comprises two dispersion compensating chirped optical fiber gratings.

7. Apparatus according to any one of claim 1, 2, 3, or 4, wherein the at least one dispersion compensating chirped optical fiber grating comprises two dispersion compensating chirped optical fiber gratings respectively coupled to the link at longitudinal positions of substantially one third and substantially two thirds of the length of the link.

8. Apparatus according to any one of claim 1, 2, 3, or 4, wherein the at least one dispersion compensating chirped optical fiber grating comprises two dispersion compensating chirped optical fiber gratings respectively coupled to the link at an input end of the link and at an output end of the link.

9. Apparatus according to any one of claim 1, 2, 3, or 4, wherein the optical fiber link has a length of under 1000 kilometers.

10. Optical communication apparatus comprising:
    an optical transmission apparatus according to any one of claim 1, 2, 3, or 4;
    an optical transmitter connected to an input end of the optical transmission apparatus, the optical transmitter being operable to generate optical signals at an optical wavelength of about 1550 nanometers; and
    an optical receiver connected at an output end of the optical transmission apparatus, the optical receiver being operable to receive optical signals at an optical wavelength of about 1550 nanometers.

* * * * *